Oct. 5, 1965

W. J. ALLEN 3,210,771

RECORDER INSTRUMENT

Filed Sept. 20, 1961

INVENTOR.
William J. Allen
BY
Mason Kolehmainen
Rathburn & Wyss.
atty's:

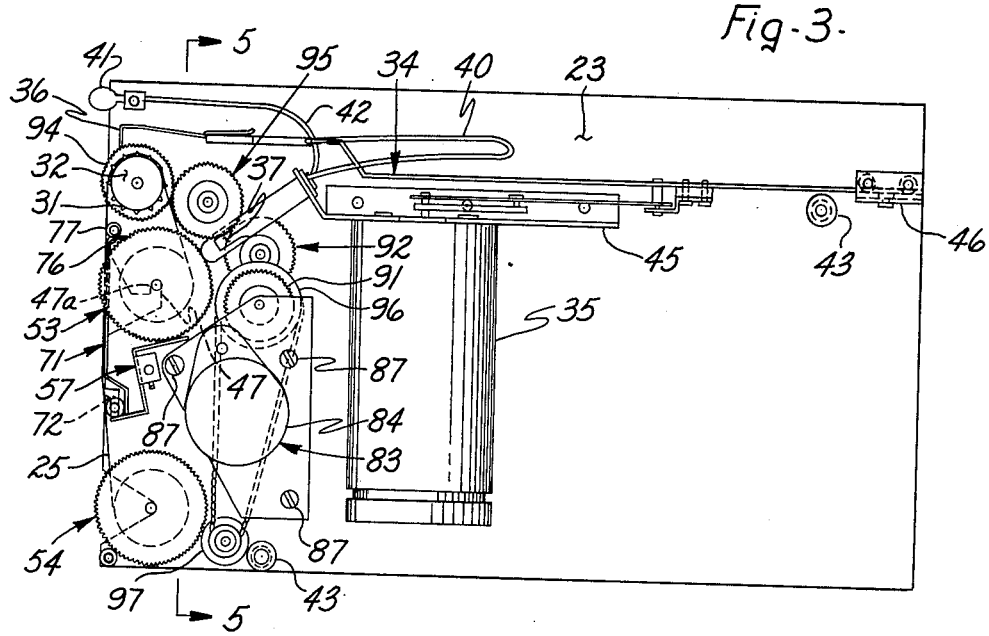
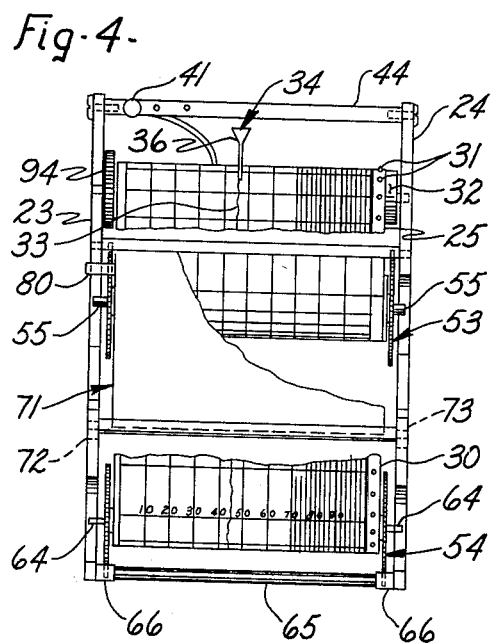
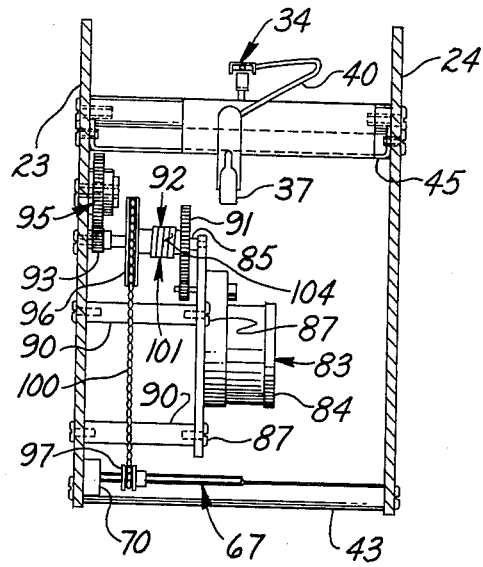

Oct. 5, 1965  W. J. ALLEN  3,210,771
RECORDER INSTRUMENT

Filed Sept. 20, 1961  4 Sheets-Sheet 3

INVENTOR.
William J. Allen
BY
Mason, Kolehmainen
Rathburn + Wyss
atty's:

Oct. 5, 1965 W. J. ALLEN 3,210,771
RECORDER INSTRUMENT
Filed Sept. 20, 1961 4 Sheets-Sheet 4
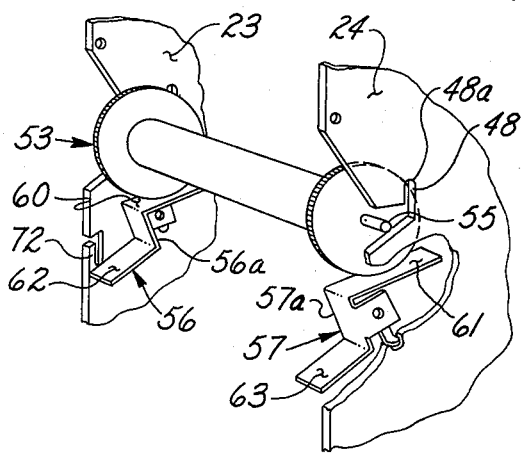
Fig-9.
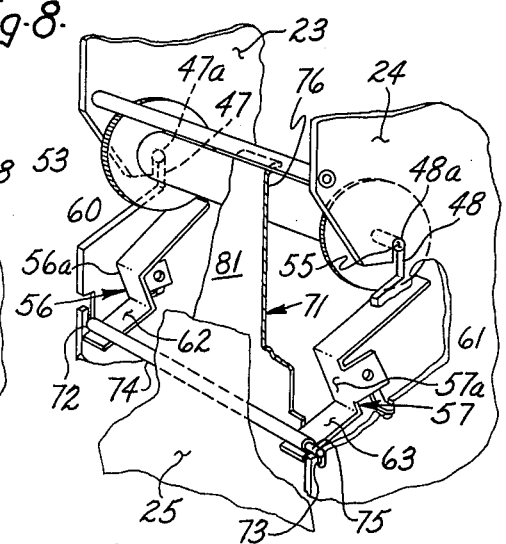
Fig-8.
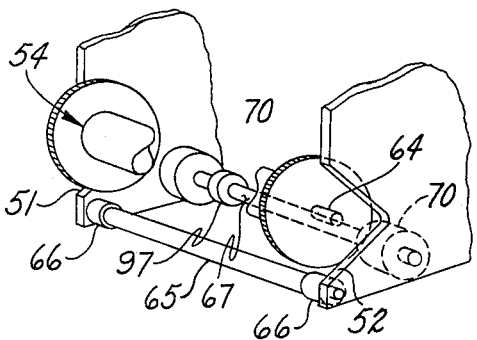
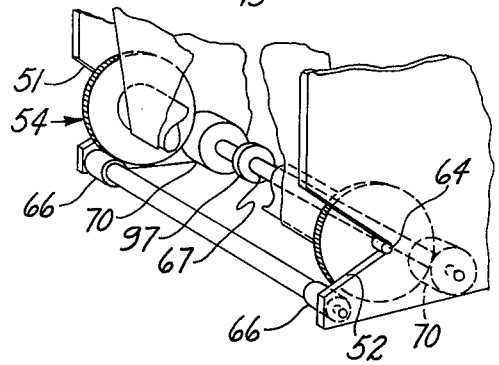
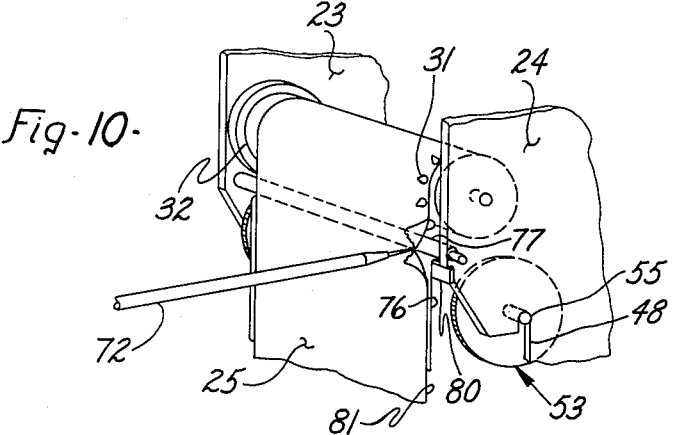
Fig-10.
INVENTOR.
William J. Allen
BY
Mason, Kolehmainen
Rathburn + Wyss
Atty's

United States Patent Office 3,210,771
Patented Oct. 5, 1965

3,210,771
RECORDER INSTRUMENT
William J. Allen, Bridgeport, Conn., assignor, by mesne assignments, to Consolidated Electrodynamics Corporation, Pasadena, Calif., a corporation of California
Filed Sept. 20, 1961, Ser. No. 139,386
4 Claims. (Cl. 346—117)

The present invention relates to recording instruments, and more particularly, to such instruments as are arranged to operate from an input signal obtained from a measuring instrument from a process control system and the like. Specifically, the present invention is directed to a recording instrument which is arranged to drive a chart at a predetermined rate to represent time as one ordinate of the chart and to drive a pen as a function of the input signal to represent the other ordinate of the chart.

A recording instrument is frequently required to be physically located remote from the variable being measured. In such a case, the recording instrument may be suitably mounted in a control panel or the like. Moreover, it is known to provide a recording instrument with a time driven recording chart so that the variable being measured appears as one of the ordinates on the chart plotted against time. Furthermore, in order to mount the recording instrument in the smallest panel opening, the recording instrument must be small in size and must conveniently be serviceable from the front of the instrument. Such service, of course, requires replacement of the recording chart and servicing of the marking system, as well as servicing and maintenance of the recorder components. Such recorder instruments are generally provided with an amplifier system wherein the input signal is received by the recorder instrument and is converted and/or amplified, as more fully described in the copending application of Edgar S. Gilchrist, Serial No. 75,461, filed December 9, 1960, and assigned to the same assignee as the present invention, to an appropriate form to be used by a marking instrument or pen drive motor which may be of the type more fully described in another copending application of Edgar S. Gilchrist Serial No. 138,779, filed September 18, 1961 and now abandoned, assigned to the same assignee as the present application.

In order to provide for accuracy in the plotting of the measured variable, it is, of course, necessary that the marking instrument be maintained in accurate alignment with respect to the time driven chart.

Since recording instruments of this general type may be manufactured and used in connection with a variety of different control applications, it may be desirable to vary the time ordinate of the recording chart. This is accomplished by driving the chart at a lesser or greater rate of speed so that each inch of chart may represent a selected time interval. For example, for one industrial application of the recording instrument, the recorder may be assembled to advance the recording chart ¾ of an inch per hour of time; in other industrial applications, it may be desirable for the recording chart to advance a greater distance per hour of time, for example, six inches per hour of time. Accordingly, it is desirable that the recording instrument may be readily and quickly modified to provide the desired chart speed for the particular installation to which the recording instrument is to be applied.

It is therefore an object of the present invention to provide an improved recording instrument.

Another object of the present invention is to provide an improved recorder instrument which is readily and easily serviced.

A further object of the present invention is to provide an improved chart recording instrument wherein the recording chart is readily removed and installed from the front of the instrument.

A further object of the present invention is to provide an improved recording instrument having a very small size.

Yet another object of the present invention is to provide an improved recording instrument which may be readily and economically manufactured.

Yet a further object of the present invention is to provide a recording instrument having an improved drive chart mechanism.

It is still another object of the present invention to provide an improved recording instrument wherein the chart may be readily and easily serviced from the front of the instrument.

Still another object of the present invention is to provide an improved recording instrument wherein the time ordinate of the chart may be selected for the desired field application.

Still another object of the present invention is to provide an improved recording instrument wherein the marking instrument is maintained in accurate alignment with the recording chart.

Briefly, the present invention is directed to a recording instrument of the type wherein there is provided a time driven chart and wherein a marking instrument bears against the chart to place an indicia on the chart representative of a measured variable. The measured variable is detected by a suitable measuring instrument which supplies an input signal to an amplifier and/or converter in the recorder and which in turn is connected to a marking instrument or marking pen drive motor. According to the present invention, the recording instrument includes a chassis formed of a pair of rigid side plates mounted in spaced parallel relation and provided with a plurality of slots in their front edge for respectively retaining the chart supply reel, the chart take-up reel, and a marking or writing surface. The chart supply reel and the writing surface are conveniently held in place by a pair of Z-shaped springs, the bight portions of which are secured to respective ones of the side plates and the respective legs of which bias the chart supply reel and the marking surface, respectively, in place. The chart take-up reel is positioned between the plates by an axial projection extending in a V-shaped groove in the front edge of the plates and rides on a take-up reel idler rotatably mounted between the plates and a take-up drive wheel supported between the plates. The take-up reel is held in place by gravity alone and, consequently, is quickly and readily removable from the instrument.

According to another feature of the present invention, the recording instrument includes a drive chart system carried by the plates and including a chart marking drum over which the chart is threaded and provided with sprockets to engage a perforated track in the chart. Chart drive means are provided for advancing the chart at the preselected rate and includes an electrically driven motor and a geared chain connected to drive the drum from the motor. The gears in the gear chain, as well as the electric motor, are readily changeable to provide for the installation of a selected motor and gear combination to provide for a predetermined rate of chart drive. An overdrive type of clutch is provided between the motor and the marking drum to permit the drum to be manually advanced while inserting a new chart or while advancing a chart along the track. Means are also provided which interconnect the take-up drive wheel and the marking drum and which tends to roll up the chart at a slightly faster rate than the controlled travel around the drum so as to continuously maintain the chart tightly wound on the take-up reel.

The invention, both as to its organization and method of operation, together with further objects and advantages thereof, will best be understood with reference to the following specification taken in connection with the accompanying drawings, in which:

FIG. 3 is a side elevational view of the improved recording instrument with one of the side plates thereof removed;

FIG. 4 is a front elevational view of the recording instrument of FIG. 3, assuming that FIG. 3 illustrated the complete instrument;

FIG. 5 is a front sectional view of the recording instrument of FIG. 3, taken along the line 5—5 of FIG. 3, and assuming that FIG. 3 illustrated the complete instrument;

FIG. 8 is a fragmentary perspective view illustrating the positioning of the chart supply reel, chart take-up reel, and writing surface in the recording instrument;

FIG. 9 is a fragmentary perspective view illustrating the chart supply reel and the chart take-up reel partially removed from the recording instrument; and FIG. 10 is a fragmentary perspective view illustrating the manner of cutting the recording chart.

Figure 1:
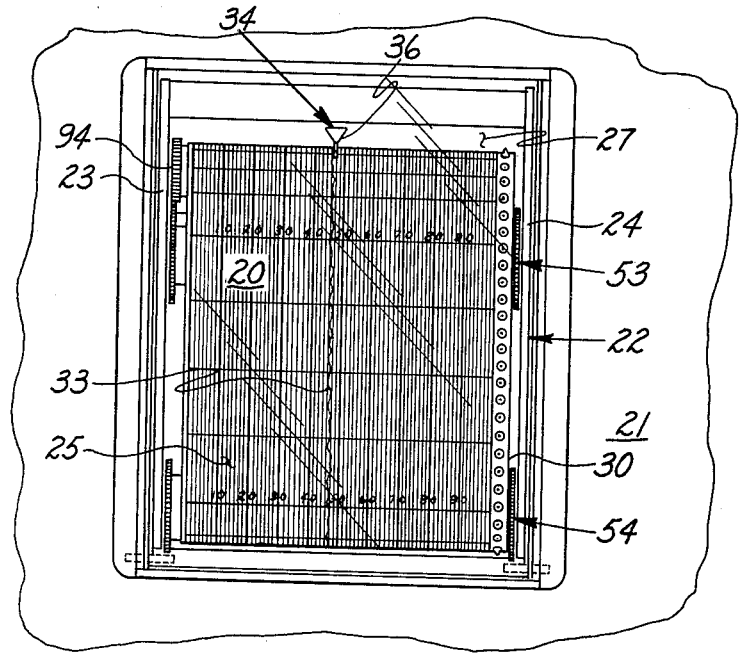
FIG. 1 is a front elevational view of a recording instrument according to the present invention and mounted in a panel.
Figure 2:
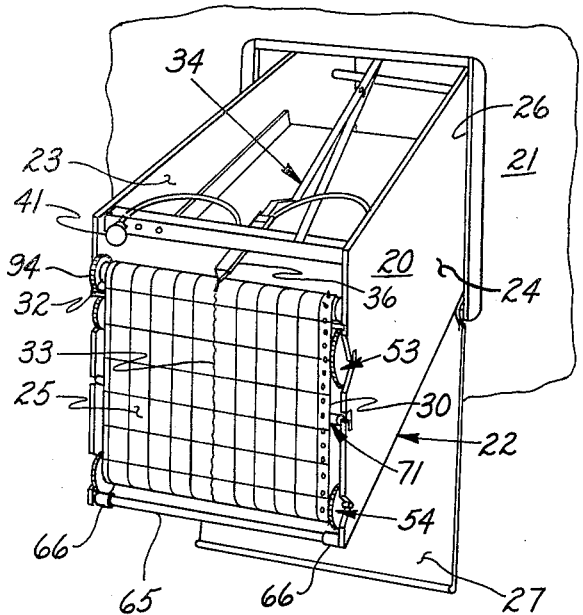
FIG. 2 is a perspective view of the recording instrument of FIG. 1, slidably withdrawn from the panel.

Referring now to the drawings, there is illustrated in FIGS. 1 and 2, a recording instrument 20 slidably mounted in a panel 21. The recording instrument 20 includes a chassis 22 formed of a pair of rigid side plates 23 and 24, and carrying a recording chart 25. The recording instrument 20 is slidably mounted in an opening 26 in the panel 21 and a glass window door 27 is hingedly mounted to the panel 21 to enclose the instrument 20 when it is within the panel 21.

The recording chart 25 is of the roll type having its horizontal ordinates representative of the measured variable and having its vertical ordinates representative of time. Moreover, in order to provide for positive drive of the chart 25, the chart 25 is provided with a perforated track 30 engageable with sprockets 31 on a chart marking and advancing drum 32.

In order to mark the chart 25 with a suitable indicia 33, there is provided a marking pen assembly illustrated generally at 34 and including a marking instrument or pen drive motor 35, which may be of the type more fully described in the above mentioned copending Gilchrist application Serial No. 138,779 filed September 18, 1961, adapted to receive a suitable input signal from an amplifier and pen drive assembly, which may be of the type more fully described in the above mentioned copending Gilchrist application, Serial No. 75,461, and which is representative of a measured variable. The input signal to the pen drive motor 35 is effective to move a suitable marking pen 36 horizontally across the recording chart 25 as representative of the measured variable. The marking pen 36 is supplied with marking ink from an ink reservoir 37 to an ink supply 40. The marking pen 36 may be primed from a priming bulb 41 through a priming line 42. It is to be understood that although the recorder instrument 20 is illustrated by way of example as having one marking pen assembly 34, the instrument may be provided with a plurality of marking pens each representing different measured variables.

In order to mount the recorder components in the smallest available space for the particular width of chart 25, the recorder chassis 22 is formed of a pair of rigid side plates 23 and 24 heretofore described which are held in spacers apart parallel relation by a plurality of spacers 43, a fixed bar 44, and a fixed plate 45, FIG. 3. The marking pen assembly 34 is mounted and supported from the fixed plate 45 and guided by a rear plate extension 46, FIG. 3, so that the marking pen 36 is always in accurate alignment with the chart marking and advancing drum 32. Moreover, the chart track components are supported between the plates 23 and 24 to provide a narrow recording instrument 20 and to maintain these components in alignment. In order to mount the chart track components of the recording instrument, the side plates 23 and 24 of the chassis 22 are provided with a plurality of grooves, slots, and recesses along their front edge. Specifically, each of the side plates 23 and 24 are provided with identical vertical slots 47 and 48 which extend upwardly, closed at their upper ends 47a, 48a and havnig their lower end open to the front edge of the side plates 23 and 24. Additionally, the side plates 23 and 24 are provided with a pair of identical V-shaped grooves 51 and 52 extending inwardly from the front edge of the plates 23 and 24. The slots 47 and 48 are adapted to receive a chart supply reel 53 and the grooves 51 and 52 are adapted to receive a chart take-up reel 54.

In order to maintain the chart supply reel 53 in position in the groove 48, the chart supply reel 53 is supplied with a pair of end projections 55 forming an axle and there is provided a pair of generally Z-shaped springs 56 and 57, FIGS. 8 and 9, each respectively having a bight portion 56a and 57a connected to the respective side plates 23 and 24 and each having one leg 60 and 61, respectively positioned to bias the supply reel 53 upwardly into the slots 48. Additionally, each of the Z-shaped springs 56 and 57 is provided with a second leg 62 and 63 respectively.

In order to provide for winding up of the marked chart 25, the take-up reel 54 is provided with a pair of end projections 64 forming an axle, FIGS. 4, 8 and 9, and which position the take-up reel 54 in the grooves 51 and 52. Moreover, there is provided a take-up reel idler shaft 65 positioned adjacent the front edge of the side plates 23 and 24 below the grooves 51 and 52 and provided with cylindrical bearing surfaces 66 adjacent its end. Moreover, there is provided a reel take-up drive wheel 67 positioned inwardly from the shaft 65 and provided with cylindrical drive portions 70 of rubber or other high friction material adjacent its edges. Both the shaft 65 and the drive wheel 67 are rotatably mounted by the side walls 23 and 34. The take-up reel 54 rests on the bearing surfaces 66 and drive portions 70 with the axle 64 positioning the take-up reel 54 between the side plates 23 and 24.

In order to complete the track for the chart 25 and to provide a marking or writing surface, there is provided a writing board 71 across the front of the recording instrument 20 between the marking and advancing drum 32 and the take-up reel 54. Specifically, the side plates 23 and 24 are provided with a second or vertical downwardly extending pair of grooves 72 and 73, closed at their lower end and communicating with the front edge at their upper ends. The writing board 71 is provided with an axle 74 at its lower end having a pair of end projections 75 extending into the grooves 72 and 73. Moreover, the upper end of the writing board 71 is provided with an arcuately shaped inwardly extending lip 76 which is engageable below and behind of a transversely extending shaft 77, as illustrated in FIGS. 3, 8, and 10. The writing board 71 is provided with a pair of transversely extending tabs 80, FIGS. 4 and 10, which bear against the front edge of the plates 23 and 24 to limit the inward movement of the writing board 71. The writing board 71 is provided with a flat planar surface 81 forming a writing or marking surface, FIGS. 8 and 10. The legs 62 and 63 of the Z-shaped springs 56 and 57 are positioned to bear against the lower end of the writing board 71 against the axle 74 thereof and thereby to bias the writing board 71 upwardly against the shaft 77 with the lip 76 in locking engagement there-with. It will be appreciated that the writing board 71 may readily be removed by a slight downward movement thereof against the upward bias of the spring legs 62 and 63 to permit pivoting the board 71 out of engagement with the shaft 77 and to lift the axle 74 out of the grooves 72 and 73. As best illustrated in FIG. 10, the separation formed between the shaft 77 and the lip 76 conveniently form a groove which provides for the cutting of the chart 25 by the point of a pencil 82 or similar instrument, thereby to provide for removal of the marking portion of the chart 25.

Figure 6:
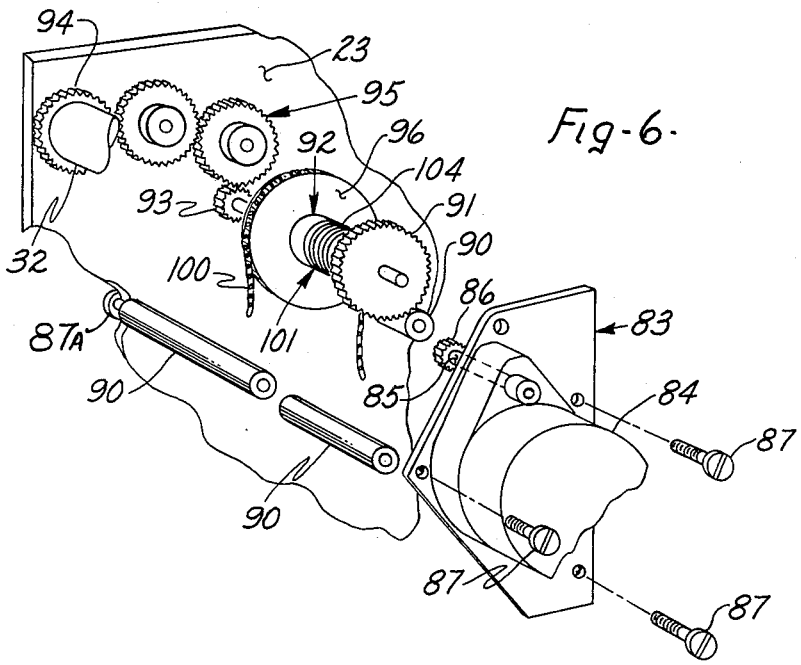
FIG. 6 is an exploded perspective view illustrating the chart drive motor and gear train assembly of the recording instrument.

In order to drive the chart marking and advancing drum 32 at the predetermined speed to advance the chart 25 at the selected rate, there is provided a motor and gear train assembly generally illustrated at 83 and best illustrated in FIG. 6. The motor and gear train assembly 83 includes an electric chart drive motor 84 having a motor drive shaft 85 and carrying a driving pinion gear 86 removably secured to the shaft 85 by a roll pin or other suitable manner. The motor 84 is detachably secured to the side plate 23 by a plurality of screws 87, here illustrated as three in number, and spaced therefrom by a plurality of spacers 90. The driving pinion gear 86 is meshed with a gear 91 removably secured to a clutch and idler shaft assembly 92 in any suitable manner as by a roll pin. The clutch and idler assembly 92 is provided with a pinion gear 93 which is drivingly connected to rotate a gear 94 on the chart marking and advancing drum 32 by means of a gear train generally illustrated at 95. It will be appreciated that the electric motor 84 is effective through the pinion 86, gear 91, pinion gear 93, gear train 95, and gear 94 on the chart marking and advancing drum 32 to advance the chart 25 at the proper rate by the positive engagement of the sprockets 31 of the chart marking and advancing drum 32 with the chart track 30. Moreover, it will be appreciated that the electric motor 84 is readily replaceable by the mere removal of the three screws 87A which are accessible from the exterior of the unit, and that the pinion 86 and gear 91 are similarly removable so that by the selection of a motor 84 of the proper speed and by the selection of the pinion 86 and gear 91, a desired rate of advance for the chart 25 may be provided for any particular field installation.

Figure 7:
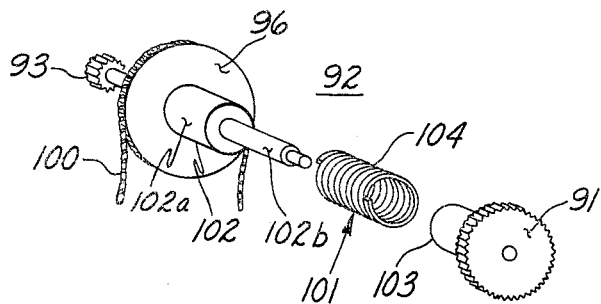
FIG. 7 is an exploded perspective view of the overdrive clutch assembly of the recording instrument.

In order to provide for continuously applying a take-up tension to the take-up reel 54, the clutch and idler shaft assembly 92 is provided with a sprocket gear 96 and the reel take-up drive wheel 67 is provided with a sprocket pinion 97 which are interconnected by a take-up chain 100, FIGS. 5, 6, and 7. The sprocket gear 96 and sprocket pinion 97 are related to drive the reel 54 through the friction drive portions 70 at a rate slightly in excess of that necessary to wind the reel 54 thereby to continuously provide a take-up bias on the reel 54 regardless of the varying diameter of chart 25 on the reel 54; the friction drive portions 70 permit lost motion between this drive and the take-up reel 54.

In order to provide for manually advancing the chart 25 during installation of the chart and during a reading of the chart, the clutch and idler shaft assembly 92 is provided with an overdrive type clutch assembly 101, best shown in FIG. 7. The clutch and idler shaft assembly 92 includes a main shaft 102 provided with a portion 102a of enlarged diameter and a second portion 102b of reduced diameter on which is rotatably mounted the gear 91 having an elongated hub 103 of the same diameter as the enlarged portion 102a of the main shaft 102. A coil spring of rectangular cross section 104 tightly wound over the enlarged portion 102a and elongated hub 103 is axially positioned to overlap, and thereby to interconnect, the hub 103 main shaft 102. The spring 104 is wound spirally with just sufficient tension so that when the hub 103 and shaft 102 are moved relatively to each other in a direction tending to tighten the winding of the spring 104, the spring 104 will tighten against the enlarged portion 102a and the hub 103 and, accordingly, will interconnect the main shaft 102 and hub 103 as though they were a single member. However, when the main shaft 102 and the elongated hub 103 are biased in a direction tending to unwind the spring 104, the spring 104 will unwind sufficiently to permit relative slippage between the main shaft 102 and the elongated hub 103. Consequently, when the electric motor 85 is driving the gear 91 clockwise, as viewed in FIG. 7, the spring 104 will be effective to drive the chart marking and advancing drum 102. However, when the chart 25 is being threaded around the drum 32 during initial installation thereof, or for purposes of reading the chart, the chart 25 may be pulled over the drum 32, rotating the drum 32 without disconnecting the motor 85, due to the slippage in the clutch assembly 101.

From the above detailed description, it will be appreciated that the rigid parallel side plates forming the chassis of the instrument maintain the marking pen in accurate alignment with the recorder chart. Moreover, since all of the components of the instrument may be serviced from the front, the chart may be readily read, removed, and installed in a convenient manner. Specifically, the marking board 81 may be readily removed by a slight downward movement to disengage the lip 76 thereof from the shaft 77 and to rotate the marking board 71 clear of the shaft 77, lifting the axle 74 thereof out of the grooves 72 and 73. Similarly, the chart supply reel 53 may be readily removed from the chassis 22 by a slight downward movement against the bias of the spring 57 and lifting the reel 53 outwardly therefrom. The chart take-up reel 54 rests by gravity against the bearing portion 56 and drive portion 70 of the members 65 and 67 respectively and, accordingly, may be removed by merely lifting from the chassis 22. Moreover, the chart 25 may be readily cut in the desired place in the groove formed between the lip 76 and the shaft 77. The parallel spaced plates provide a minimum instrument width for a desired width of chart 25. Moreover, the motor and gear assembly 83 may be readily removed by the removal of the three screws 87 to permit installation of a motor 84, pinion 86, and gear 91 having the desired speed characteristics to provide a predetermined rate of chart advancement as determined by the particular installation requirement of the recorder instrument.

While a particular embodiment of the invention has been shown, it will be understood, of course, that it is not desired that the invention be limited thereto since modifications may be made, and it is, therefore, contemplated by the appended claims to cover any such modifications as fall within the true spirit and scope of the invention.

What is claimed as new and desired to be secured by Letters Patent of the United States is:

1. A recorder instrument comprising a chassis formed of a pair of parallel side plates, said plates each being provided with identical V-shaped grooves extending inwardly from their front edge, with identical vertical first slots extending upwardly and spaced inwardly from said front edge to receive a chart supply reel, said first slots being closed at their upper ends and having their lower ends opened to said front edge, and additionally being provided with vertical second slots extending downwardly between said grooves and said first slots and having their upper ends opened to said front edges; a marking instrument assembly supported between said plates and including a marking instrument and means driving said instrument in response to a measured variable; a take-up reel idler rotatably mounted between said plates below said V-shaped groove near the front edge thereof; a take-up drive wheel supported between said plates and spaced inwardly of said take-up reel idler; a chart take-up reel riding on said drive wheel and said take-up reel idler having axial portions extending in said V-shaped grooves; a chart supply reel positioned in the first slots;

a member positioned between said plates below said chart supply reel; a writing board having a planar surface and provided with an axle at its lower end fitting into said second slots and provided with means at its upper end for locking with said member and said front edge; a pair of generally Z-shaped retaining springs having a bight portion secured to respective ones of said plates and having a first leg positioned to bear upwardly against said chart supply reel to retain said reel assembled between said plates and having a second leg positioned to bear against the axle of said writing board to bias said writing board into locking relation with said member; a chart drive system mounted on at least one of said plates and including a chart marking drum rotatably supported between said plates and having sprockets to engage a perforated track in a chart and chart drive means including a motor and gear train connected to drive said drum at a predetermined rate, said gear train and motor being readily changeable to provide for installation of a selected motor and gear combination to provide for said predetermined rate of chart drive, said gear train including an overdrive type of clutch permitting said drum to be manually advanced to provide for threading of said chart around said drum and to provide for the manual advance of said chart, said drive means additionally including means drivingly interconnecting said drive wheel and said marking drum for continuously maintaining the chart wound on said take-up reel.

2. A recorder instrument as set forth in claim 1 above wherein said clutch includes a shaft having a first portion of enlarged diameter and a second portion of reduced diameter, a member rotatably mounted on said second portion having a cylindrical portion with an external diameter equal to the diameter of said first portion, and a coil spring of rectangular cross section tightly wound and overlapping said first portion and said cylindrical portion.

3. A recorder instrument comprising a chassis including side members having parallel front portions, said portions each being provided with identical V-shaped grooves extending inwardly, with identical vertical first slots extending upwardly and spaced inwardly to receive a chart supply reel, said first slots being closed at their upper ends and having their lower ends open at the front, and additionally being provided with vertical second slots extending downwardly between said grooves and said first slots and having their upper ends open at the front; a take-up reel idler rotatably mounted on said chassis below said V-shaped grooves; a take-up drive wheel supported on said chassis and spaced from said take-up reel idler; a chart take-up reel riding on said drive wheel and said take-up reel idler having axial portions extending in said V-shaped grooves; a chart supply reel positioned in the first slots; means associated with said chassis biasing said chart supply reel in said first slots; a chart drive system mounted on said chassis and including a rotatably driven chart marking drum having means to positively engage a chart, said chart drive system additionally including means drivingly interconnecting said drive wheel and said marking drum for continuously maintaining the chart wound on said take-up reel; and a marking instrument assembly supported by said chassis driven in response to a measured variable and having a marking pen riding on said drum.

4. A recorder instrument comprising a chassis including side members having parallel side portions, said portions each being provided with identical first grooves extending inwardly from their front edge, with identical vertical first slots extending upwardly from said front edge to receive a chart supply reel, and additionally being provided with vertical second slots extending downwardly between said grooves and said first slots; a chart take-up reel having axial portions extending in said grooves; a chart supply reel positioned in said first slots; a cross member supported from said chassis and positioned between said portions below said first slots; a writing member having a planar surface and provided with means at its lower end fitting into said second slots and provided with means at its upper end for locking with said cross member and said front edge; a pair of spring members secured to respective ones of said side members and having a first portion positioned to bear upwardly against said chart supply reel to retain said reel assembled in said first slots and having a second portion positioned to bear against said writing member to bias said writing member into locking relation with said cross member; a chart drive means mounted on said chassis and including a chart marking drum rotatably driven at a preselected rate, and additionally including means drivingly interconnected to said take-up reel; and a marking pen supported on said chassis for engaging a chart on said drum.

References Cited by the Examiner
UNITED STATES PATENTS

| | | | |
|---|---|---|---|
| 2,520,918 | 9/50 | Elarde | 346—145 |
| 2,663,609 | 12/53 | Jones | 346—24 |
| 2,833,383 | 5/58 | Christensen | 192—41 |
| 2,847,866 | 8/58 | Thurmond | 346—136 |
| 2,907,427 | 10/59 | Dowd | 192—41 |
| 2,924,499 | 2/60 | Young et al. | 346—145 |
| 2,942,927 | 6/60 | Keyser | 346—117 |

LEYLAND M. MARTIN, *Primary Examiner.*

WILLIAM MISIEK, LEO SMILOW, *Examiners.*

UNITED STATES PATENT OFFICE
CERTIFICATE OF CORRECTION

Patent No. 3,210,771　　　　　　　　　　　　　　　October 5, 1965

William J. Allen

It is hereby certified that error appears in the above numbered patent requiring correction and that the said Letters Patent should read as corrected below.

Column 1, line 42, strike out "now abandoned,".

Signed and sealed this 21st day of June 1966.

(SEAL)
Attest:

ERNEST W. SWIDER
Attesting Officer

EDWARD J. BRENNER
Commissioner of Patents